(12) United States Patent
Etienvre et al.

(10) Patent No.: US 12,228,888 B2
(45) Date of Patent: Feb. 18, 2025

(54) METHOD FOR MANUFACTURING A CARBON-CARBON TIMEPIECE COMPONENT

(71) Applicant: LORIGE, Paris (FR)

(72) Inventors: Clément Etienvre, Rennes (FR); Emeric Paraud, Rennes (FR)

(73) Assignee: LORIGE, Paris (FR)

( * ) Notice: Subject to any disclaimer, the term of this patent is extended or adjusted under 35 U.S.C. 154(b) by 720 days.

(21) Appl. No.: 17/312,849

(22) PCT Filed: Dec. 10, 2019

(86) PCT No.: PCT/FR2019/000207
§ 371 (c)(1),
(2) Date: Jun. 10, 2021

(87) PCT Pub. No.: WO2020/120848
PCT Pub. Date: Jun. 18, 2020

(65) Prior Publication Data
US 2021/0333760 A1   Oct. 28, 2021

(30) Foreign Application Priority Data

Dec. 11, 2018   (FR) ...................................... 1872697

(51) Int. Cl.
*G04B 37/22*     (2006.01)
*B23P 15/00*     (2006.01)
(Continued)

(52) U.S. Cl.
CPC ............ *G04B 37/225* (2013.01); *B23P 15/00* (2013.01); *B29C 39/42* (2013.01); *G04B 37/22* (2013.01);
(Continued)

(58) Field of Classification Search
CPC .......... G04B 37/00–0008; G04B 37/18; G04B 37/22; G04B 37/225; Y10T 29/49579;
(Continued)

(56) References Cited

U.S. PATENT DOCUMENTS 3,952,499 A * 4/1976 Reisman ................ G04B 19/06
968/294
7,641,381 B2   1/2010 Levingston
(Continued)

FOREIGN PATENT DOCUMENTS

EP     1449888 A1    8/2004
EP     3047337 A2    7/2016
(Continued)

OTHER PUBLICATIONS

Translation of WO2018066156 (Year: 2018).*
(Continued)

*Primary Examiner* — Matthew P Travers
(74) *Attorney, Agent, or Firm* — BENOIT & COTE INC.

(57) ABSTRACT

The manufacturing method comprises at least one processing step for a carbon-carbon composite part (100, 200). In a first variant, the method comprises steps for machining and a step for processing the part. In a second variant, the method comprises a crushing step for the part before the processing step and a moulding step after the processing step. Application to manufacturing timepiece components (170, 270).

8 Claims, 12 Drawing Sheets

(51) Int. Cl.
*B29C 39/42* (2006.01)
*B29K 105/26* (2006.01)
*B29K 507/04* (2006.01)
*B29L 31/00* (2006.01)
*C04B 35/83* (2006.01)
*B29C 39/00* (2006.01)
*B29K 63/00* (2006.01)
*B29K 105/16* (2006.01)

(52) U.S. Cl.
CPC ........ *B29C 39/003* (2013.01); *B29K 2063/00* (2013.01); *B29K 2105/16* (2013.01); *B29K 2105/26* (2013.01); *B29K 2507/04* (2013.01); *B29L 2031/739* (2013.01); *C04B 35/83* (2013.01); *Y10T 29/49579* (2015.01)

(58) Field of Classification Search
CPC ......... Y10T 29/49583; Y10T 29/49584; Y10T 29/49588–49597; Y10T 29/49751; A44C 5/00; A44C 27/00–001; B29L 2031/739; C04B 35/83; B23P 15/00; B29C 39/42; B29K 2507/04
See application file for complete search history.

(56) References Cited

U.S. PATENT DOCUMENTS

2013/0199412 A1\* 8/2013 Christ .................... C04B 35/83
264/29.2
2020/0061954 A1 2/2020 Francois et al.

FOREIGN PATENT DOCUMENTS

| EP | 3339978 A1 | 6/2018 |
| FR | 2842313 A1 | 1/2004 |
| WO | 2016151394 A2 | 9/2016 |
| WO | 2018066156 A1 | 4/2018 |

OTHER PUBLICATIONS

Jacques Thébault Et Pierre Olry, "Les composites carbone/carbone", l'actualité chimique—mars-avril 2006—n° 295-296, p. 47-51.

\* cited by examiner

METHOD FOR MANUFACTURING A CARBON-CARBON TIMEPIECE COMPONENT

The invention relates to the technical watchmaking field.

It relates to a timepiece component in a composite material.

It also relates to a method for manufacturing a timepiece component in a composite material.

Timepiece components are conventionally made up of metallic materials such as stainless steel, titanium, or precious materials such as gold, platinum or silver.

Increasingly, metallic materials are replaced with composite materials for the manufacture of some timepiece components, due to their light weight and aesthetic properties.

According to a first aspect, the invention relates to a method for manufacturing timepiece components from a carbon-carbon composite material part.

More specifically, the method for manufacturing a timepiece component comprises a step for processing a carbon-carbon composite material part.

The carbon-carbon composite material is appreciated for its properties that include very good heat resistance, very good resistance to heat shocks and very good resistance to wear during friction at high temperature. Therefore, it is used to manufacture:
- brake pads or disks of racing vehicles, cars or motorcycles,
- airplane brake disks,
- space shuttle tiles,
- rocket nozzles,
- friction disks for clutch systems on racing vehicles.

The article "Carbon-carbon composite materials" by Jacques Thébault and Pierre Olry, published in the magazine "L'actualité chimique"-March-April 2006-no. 295-296 describes the carbon-carbon composite material as resulting from the fusion between a fibrous stiffener and a binding matrix that both have the same chemical nature.

The fibrous stiffener is made up of a carbon fibre texture, produced via mechanical means used in the textile industry. The binding matrix is a carbonaceous matrix whose role is to fill the pores in the fibrous structure.

According to a first aspect of the invention, the method for manufacturing a timepiece component comprises a processing step of a carbon-carbon composite material part.

According to a first variant of the first aspect of the invention, the manufacturing method comprises steps for machining and a step for processing said part.

According to a characteristic of the method according to the first variant, the processing step is preceded by a first step for machining the carbon-carbon composite part and followed by a second step for machining said part.

The first machining step is a pre-machining step by milling, for the preparation of a face of the part before the processing step. In particular, areas having a predetermined raised section are created on said face. According to the required timepiece component, areas having a predetermined hollow section can also be created on said face.

The second machining step is an actual machining step by milling of the same face of said part after the processing step.

According to another characteristic, the method according to the first variant comprises at least one additional machining step, subsequent to the second machining step. Said at least one additional machining step can be a part trimming step, a milling step of the other face of the part, a finishing step.

The processing step comprises a resin casting operation that consists of pouring liquid resin onto the face of the part that has undergone the pre-machining operation. The resin may be a thermosetting resin, such as an epoxy resin or a phenolic resin. The resin may be a thermoplastic resin.

The processing step then comprises a vacuum process operation that occurs simultaneously with a curing operation. Finally, it comprises a post-curing operation. The vacuum process supports the penetration of the resin in the material's pores. The curing process initiates the resin's polymerisation process. The post-curing process brings the resin to its maximum hardness.

Therefore, according to the first variant of the method, the initial part in a carbon-carbon composite material is first prepared by a pre-machining process, before being subjected to a process during which the carbon-carbon composite material is impregnated with a resin. Then the timepiece component is produced by machining the processed part to the required shapes.

The penetration of the resin in the carbon-carbon composite material increases the part's mechanical strength and sealing. It also improves its aesthetic aspect.

According to a second variant of the first aspect of the invention, the manufacturing method comprises a fine crushing step of said carbon-carbon composite material part, then a processing step of the resulting homogenate, and finally a moulding step of the homogenate subjected to the processing step.

The processing step comprises a resin casting operation that consists of pouring resin onto the carbon-carbon material homogenate and mixing them together. It also comprises an operation for heating up the mixture comprising the homogenate and the resin.

The moulding step comprises a filling operation of a mould having the definite shape of the required part with the mixture made up of the homogenate and resin, then a pressing operation, and finally a demoulding operation.

According to a characteristic of the second variant of the method, the heating up operation of the processing step and the pressing operation of the moulding step occur simultaneously and result in the polymerisation of the resin.

According to a characteristic of the second variant, the method comprises an optional operation of washing the homogenate fines, which precedes the processing step.

According to another characteristic of the second variant, the method comprises an optional operation of screening the homogenate fines, which precedes the processing step.

Therefore, according to the second variant of the method, the initial part in a carbon-carbon composite material is first prepared by crushing into fines, which are then subjected to a process during which the carbon-carbon composite material is impregnated with a resin. Then the timepiece component is produced by moulding the processed fines to the required shapes.

Whether it is for the first variant of the method or for the second variant of the method, the processing step comprises a resin casting step during which the carbon-carbon composite material is impregnated with a resin. With the first variant of the method, the carbon-carbon material is impregnated by penetration of the resin from a pre-machined face. With the second variant of the method, the carbon-carbon material is impregnated by mixing the resin with a carbon-carbon material homogenate. This impregnation advantageously improves the carbon-carbon material's properties, including its mechanical strength, its sealing, its resistance to UV rays, its aesthetics, its dermatological compatibility.

Preferably, the carbon-carbon composite part stems from a brake pad or disk of a racing vehicle or a brake disk of an airplane or a space shuttle tile.

The carbon-carbon composite material part may be a new part. Advantageously, the carbon-carbon composite material part is a used part. In this case, the method according to the invention contributes to meeting the ninth of the UN's seventeen sustainable development objectives.

According to a second aspect, the invention relates to a timepiece component produced by the method according to the first aspect of the invention.

The timepiece components according to the invention may be, in particular, cases, backs, middle cases, bezels, as well as dials, hands, strap links, whole straps, plates, bridges, including barrel bridges, gear train bridges, escapement bridges, pallet bridges, balance bridges, crowns.

The invention will be better understood upon reading the following detailed description of two special embodiments, provided for illustration purposes only and not restrictive, of a method according to the invention for manufacturing a timepiece component comprising a one-piece middle case and dial assembly, wherein:

FIGS. 2 to 5 show a digitally controlled machine tool for the implementation of the first variant of the method;

The embodiment of the first variant of the method will be described in reference to FIGS. 1 to 17.

Figure 1:
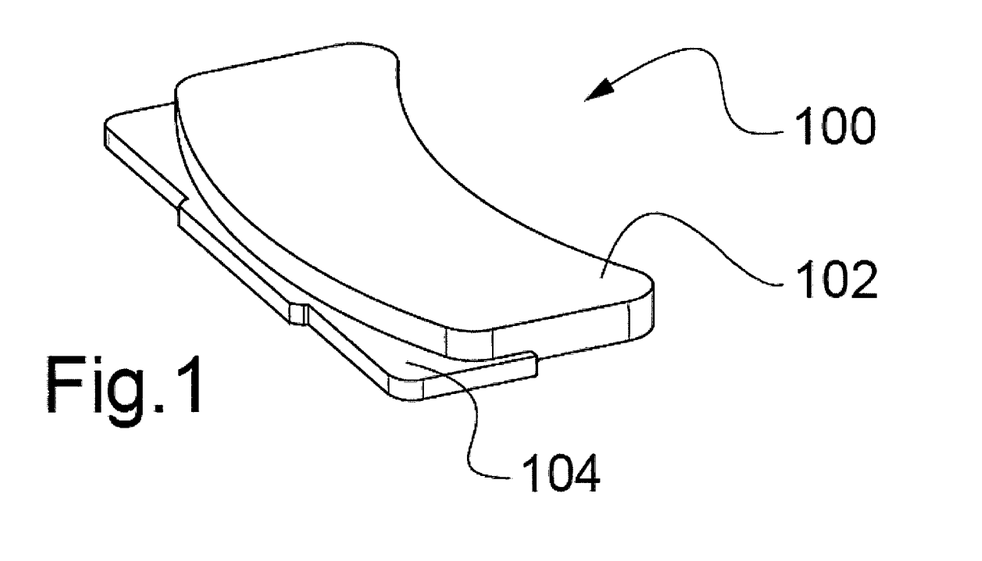
FIG. 1 shows, in a top perspective view, an initial part in a carbon-carbon composite material, prior to the implementation of the first variant or second variant of the method.
Figure 2:
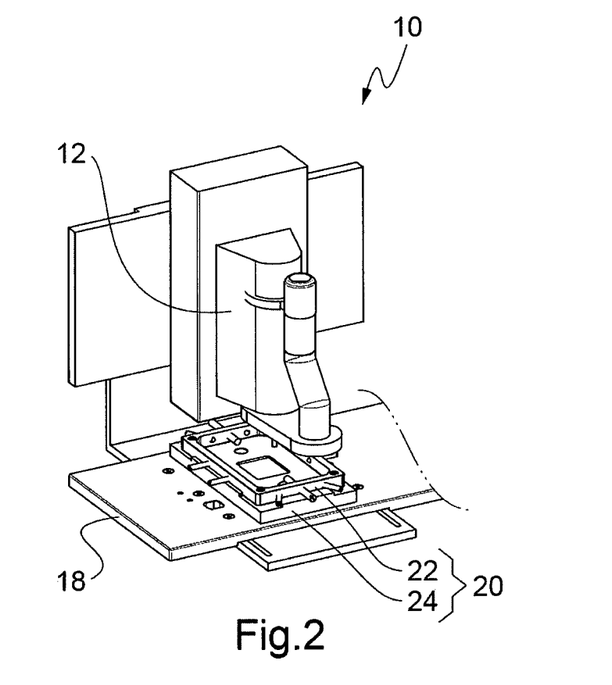
FIG. 2 shows, in a top perspective view, the machine tool fitted with a first machining fixture used for the first machining step, for the second machining step and for a third machining step.

By first referring to FIG. 1, an initial part 100 is shown, intended for the manufacture of a timepiece component by the implementation of the first variant of the method according to the invention or by the implementation of the second variant of the method according to the invention.

According to the invention, said initial part 100 is made up of carbon-carbon composite material.

In the example shown in the figures, said initial part 100 is a brake pad of a racing vehicle, comprising an active part 102 intended to be subjected to friction when the vehicle brakes, and a fastening part 104 intended to hold the brake pad in a calliper of the vehicle. Said active 102 and fastening 104 parts of part 100 were produced in one piece by milling a rough block in a carbon-carbon composite material.

FIGS. 2 to 5 show a digitally controlled machine tool 10, for example a 4 axis digital milling machine such as ISEL ICP 2015, having a spindle 12 allowing high rotational speeds, greater than 15,000 revolutions per minute.

Figure 5:
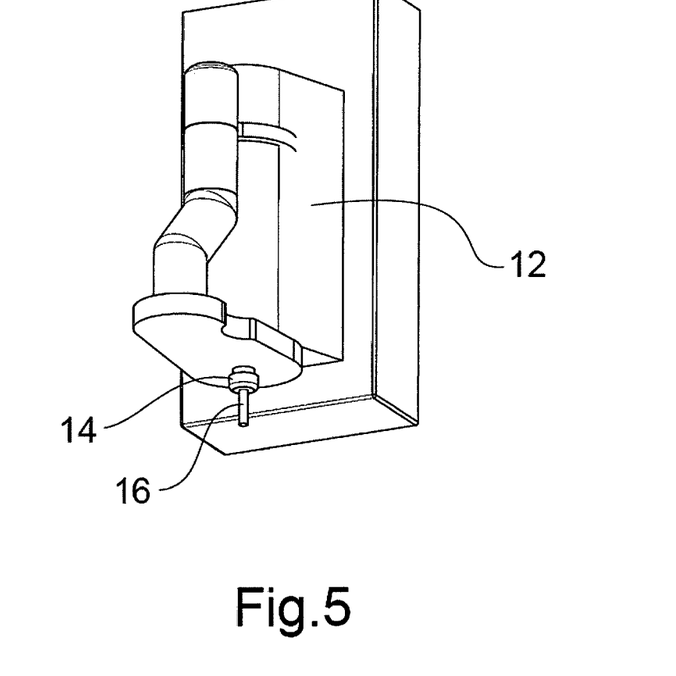
FIG. 5 shows, in a bottom perspective view, a part of the machine tool not shown in FIGS. 2 to 4.

As shown more specifically in FIG. 5, the machine tool 10 also comprises a tool holder 14 driven by the spindle 12, and machining tools, identified by the reference number 16, which are changed according to requirements during the machining steps. Said machining tools 16 are diamond coated to reduce their wear due to friction with the dust produced during the machining steps.

Machine tool 10 also comprises a plate 18 which will successively accommodate a base 24 of a first machining fixture 20 (FIG. 2), a second machining fixture 30 (FIG. 3) and a third machining fixture 40 (FIG. 4), for the implementation of the machining steps of the method.

Said machining fixtures 20, 30, 40 are not only designed for the various machining steps, but also for the shape and dimensions of the parts machined during the various steps of the method, as well as for the shape and dimensions of the final timepiece component required.

Figure 6:
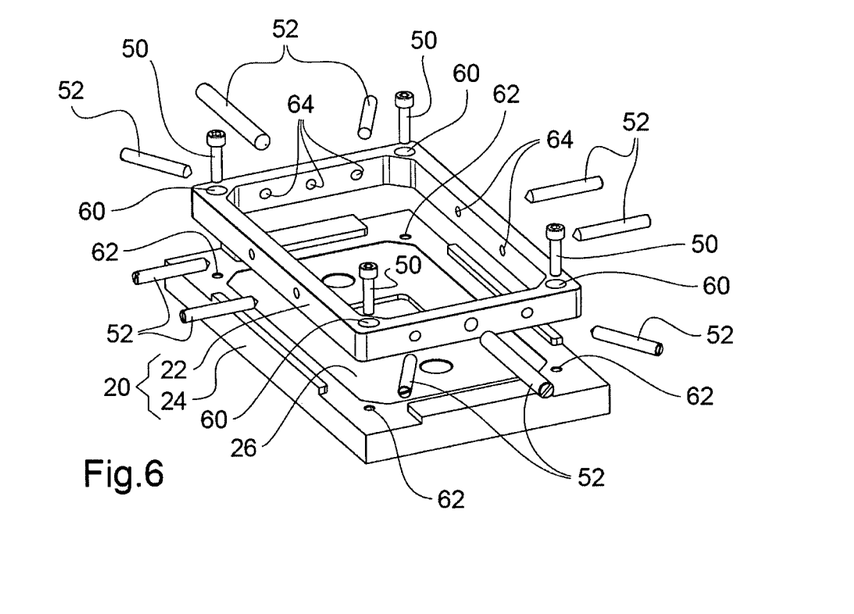
FIG. 6 shows, in an exploded perspective view, the first machining fixture.
Figure 7:
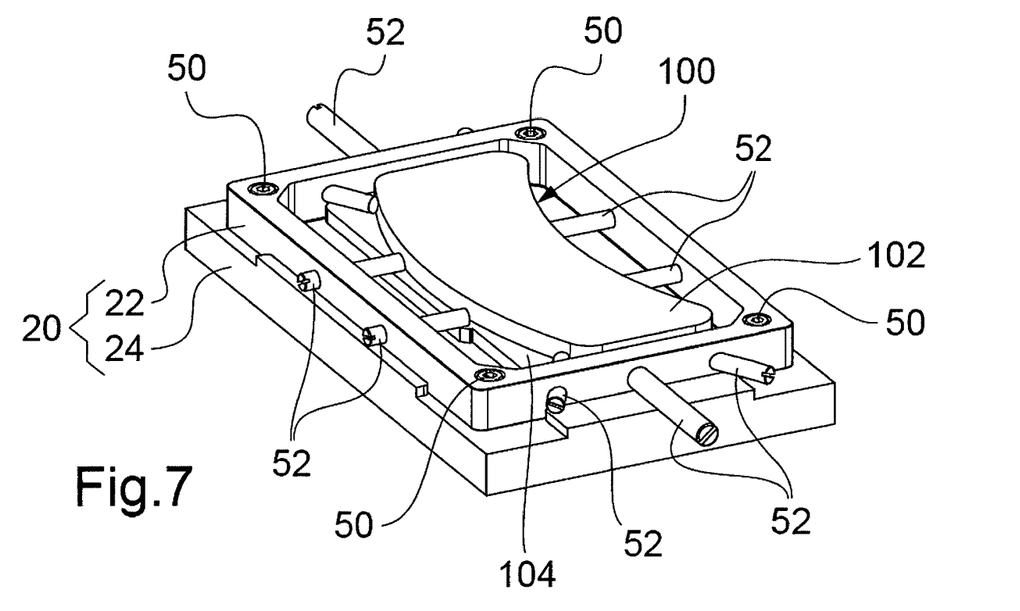
FIG. 7 shows, in a perspective view, the initial part held by the first machining fixture, before the first machining step.

First machining fixture 20, shown in FIGS. 6 and 7, comprises a frame 22 and a base 24.

Figure 4:
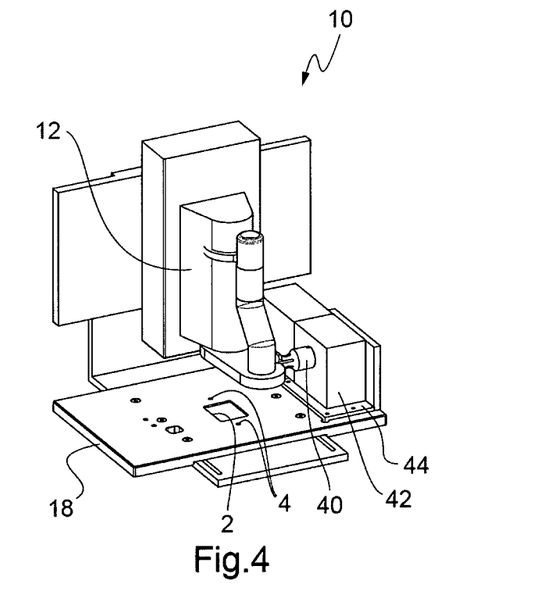
FIG. 4 shows, in a top perspective view, the machine tool fitted with a third machining fixture used for a fifth machining step.

Base 24 is attached to plate 18 (FIG. 2) with a centring cavity 2 (see FIG. 4) via screws, for example M8 screws (not shown), which cooperate with two mounting holes 4 on plate 18 (FIG. 4).

In operation, frame 22 is positioned on base 24 with a positioning cavity 26 materialised on said base 24 (FIG. 6).

Frame 22 and base 24 are assembled to one another with cap screws 50, which cooperate with holes 60 of frame 22 and with bores 62 of base 24.

Frame 22 and base 24 are machined metal parts. For example frame 22 is made of steel and base 24 is made of aluminium. They are specially designed and sized to hold the part to be machined during the first machining step, second machining step and third machining step that will be described below.

FIG. 7 shows initial part 100, which is firmly secured to frame 22 with set screws 52, which cooperate with the tapped holes 64 of said frame 22. In the example illustrated, set screws 52 are distributed around the edge of frame 22 and there are ten of them.

The assembly comprising frame 22 and initial part 100 is then nested on base 24 and secured to it with screws 50, of which there are four in the illustrated example and are of the CHC M5 type for example.

Initial part 100 is fitted to first machining fixture 20. In the example illustrated, it is fitted so that, when machining on machine tool 10 (FIG. 2), its active part 102 is exposed to machining tool 16 (FIG. 5).

Figure 8:
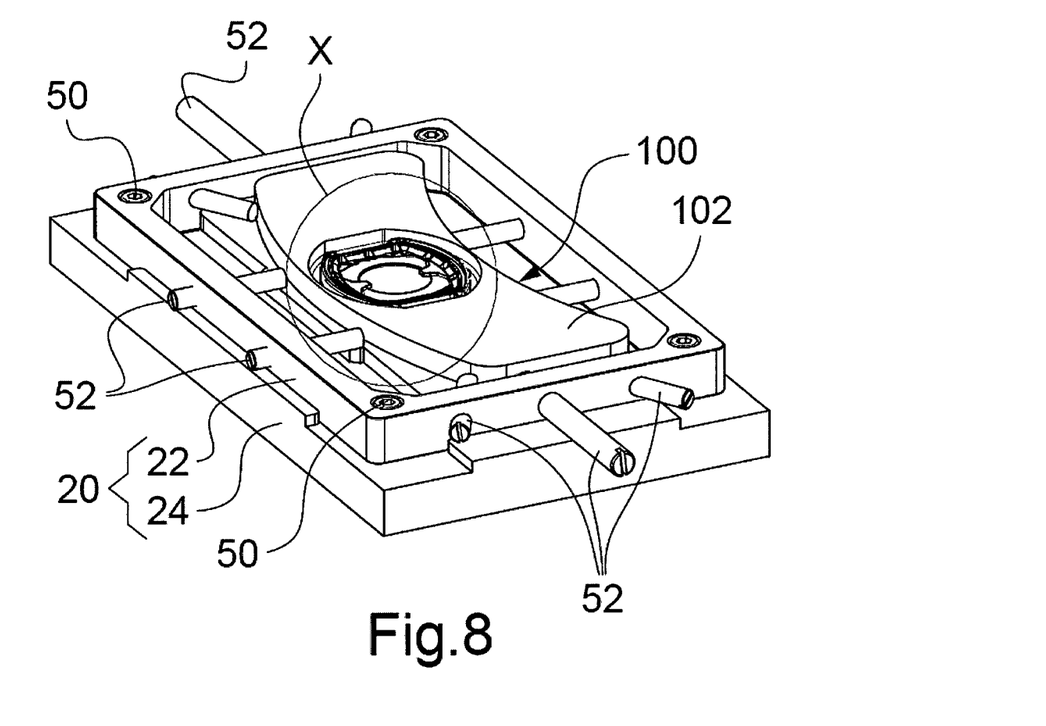
FIG. 8 shows, in a perspective view, the part produced following the first machining step of the first variant of the method.

Initial part 100 then undergoes a first machining step, shown in FIG. 8, which involves a pre-machining operation by milling its exposed face, to create a concave shape. The displacement of machining tool 16 is set to machine a blank 110 having the required design.

The displacement settings of machining tool 16 are also configured to create on said blank 110:
 surfaces higher than the reference surface of said blank 110, comprising first areas 112 having a predetermined raised section,
 surfaces lower than the reference surface of said blank 110, comprising second areas 114 having a predetermined hollow section and third areas 116 having a predetermined hollow section, Preferably, the raised section is between 0 millimetre and 1 millimetre. Even more preferably, said raised section measures 0.3 millimetre.

Preferably, the hollow section is between 0 millimetre and 0.2 millimetre. Even more preferably, said hollow section measures 0.1 millimetre.

Figure 9:
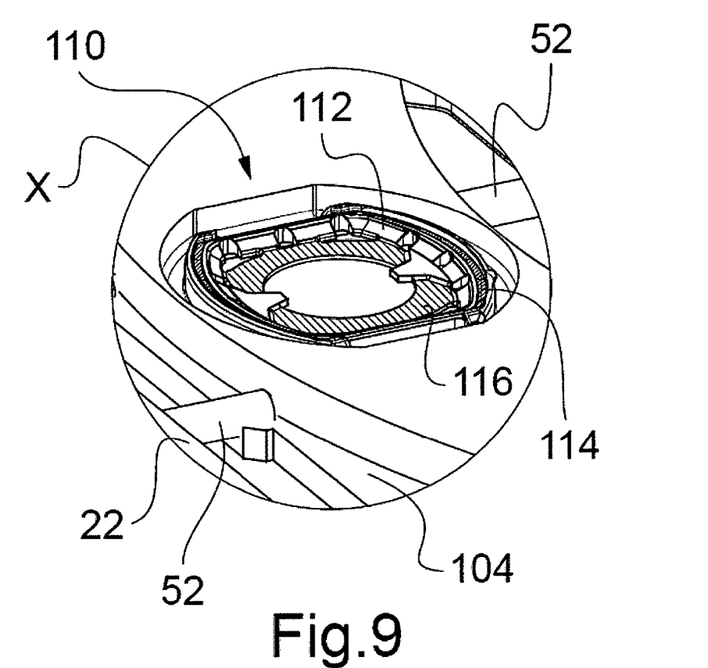
FIG. 9 is an enlarged view of zone X of FIG. 8.

FIG. 9 shows the layout of the first raised section areas 112, located on surfaces intended to be visible externally on the final timepiece component produced with the method. Their presence prevents the appearance of surface defects during the execution of a subsequent machining step.

FIG. 9 also shows the second hollow section areas 114 located on the surfaces intended to be contact surfaces of the final timepiece component produced with the method, such as a gasket surface for a middle case.

FIG. 9 finally shows the third hollow section areas 116 located on surfaces intended to become decorative surfaces of the final timepiece component produced with the method.

Initial part 100 on which blank 110 was formed is now a first intermediate part 120 resulting from the first machining step, with pre-machined surfaces comprising many rough surfaces.

Said first intermediate part 120 is still secured to frame 22 of machining fixture 20 with set screws 52. Said frame 22 is disassembled from base 24 of machining fixture 20, said base 24 remaining attached to plate 18 of machine tool 10 with centring cavity 2.

First intermediate part 120 then undergoes a processing step, comprising a resin casting operation, then a vacuum process operation simultaneous with a curing operation, then a post-curing operation.

Figure 10:
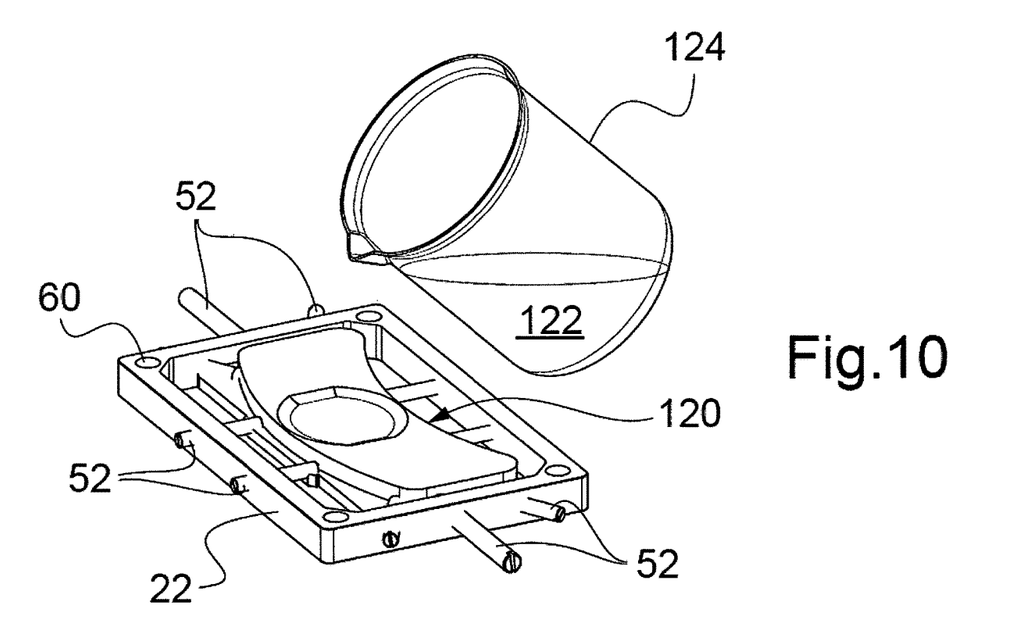
FIG. 10 shows, in a perspective view, the resin casting operation of the processing step of the first variant of the method.

The resin casting operation is shown in FIG. 10. It involves pouring a resin 122 into blank 110, for example by means of a container 124, in order to fill said blank 110 at least partially.

Resin 122 is an epoxy, thermosetting resin. In fact, epoxy resins have a good mechanical strength, compatible with the stresses that will be applied to the final timepiece component when in use. Epoxy resins also have a low shrinking level compared with other resins. Epoxy resins are also known for producing a better visual aspect of the final timepiece component, as they have a good resistance to UV rays, and because transparent epoxy resins are readily available.

Optionally, a coloured additive may be added to the thermosetting resin for decorative purposes.

The vacuum process operation is not shown in the figures. It involves installing frame 22, which holds first intermediate part 120 wherein resin 122 has been poured, in a sealed container and vacuumising said container. This process can last up to 24 hours, with a temperature between 20 and 25 degrees Celsius inside the container.

The vacuum process operation facilitates the penetration of resin 122 inside the carbon-carbon material, while eliminating any residual air bubbles inside said resin 122 after blank 110 has been filled.

The vacuum process operation is complemented with a curing operation, not shown in the figures, which can be performed in the open, with frame 22 being removed from the sealed container, or which can be performed under vacuum, with frame 22 remaining in the sealed container. According to the resin used and the hardness required for the final timepiece component to be produced, the curing operation can last between 3 and 24 hours, with a temperature of up to 150 degrees Celsius. The curing operation initiates the polymerisation of the resin.

The curing operation is followed by a post-curing operation, which brings resin 122 to its maximum hardness.

First intermediate part 120, wherein resin 122 was poured and then set during the processing step now makes up a second intermediate part 130.

Resin 122 has penetrated inside the carbon-carbon composite material. The penetration distance is at least 0.5 millimetre. The presence of resin 122 eliminates the rough surfaces generated by the first machining step and results in smoother surfaces, in particular at the second areas 114 and third areas 116 having a hollow section.

Frame 22 holding second intermediate part 130 is reassembled onto base 24, which has remained secured to plate 18 of machine tool 10. Frame 22 returns to its initial position on base 24 via positioning cavity 26.

A second machining step, similar to the first machining step, is then performed on second intermediate part 130.

Said second machining step comprises an actual machining process, by milling. It results in the removal of resin 122, poured into blank 110 and which has set during the processing step.

Machining tool 16 is now set up in order to eliminate first raised section areas 112, which had been left on blank 110 during the first machining step.

Machining tool 16 is also set up in order to make second hollow section areas 114 and third hollow section areas 116 level with the reference surface.

The second machining step leaves a residual coat of resin 122, which fills said second hollow section areas 114 and said third hollow section areas 116. Blank 110 now has an overall uniform surface, with some resin-coated zones 134, 136. These zones 134, 136 can be intended to come in contact with other parts, such as gasket surface zones 134 of the final timepiece component, for example. These zones can also be intended to become decorative zones 136 of the final timepiece component. In decorative zones 136, the thickness of the resin affects the opacity of the decoration. Coloured additives may also be added previously to resin 122 to contribute to the decorative effect.

Figure 11:
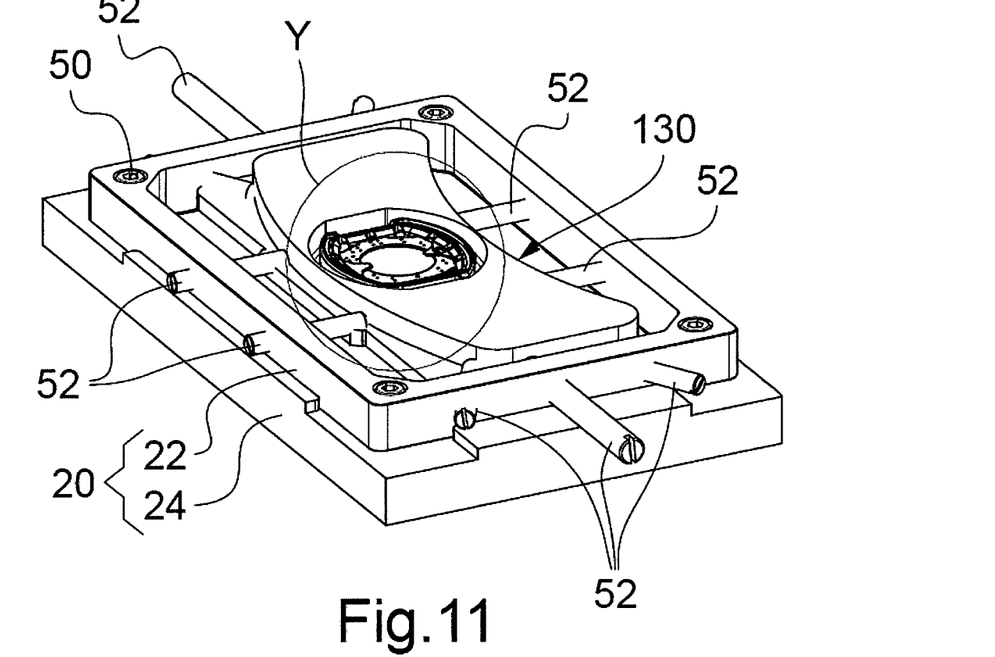
FIG. 11 shows, in a perspective view, the part produced following the second machining step of the first variant of the method.
Figure 12:
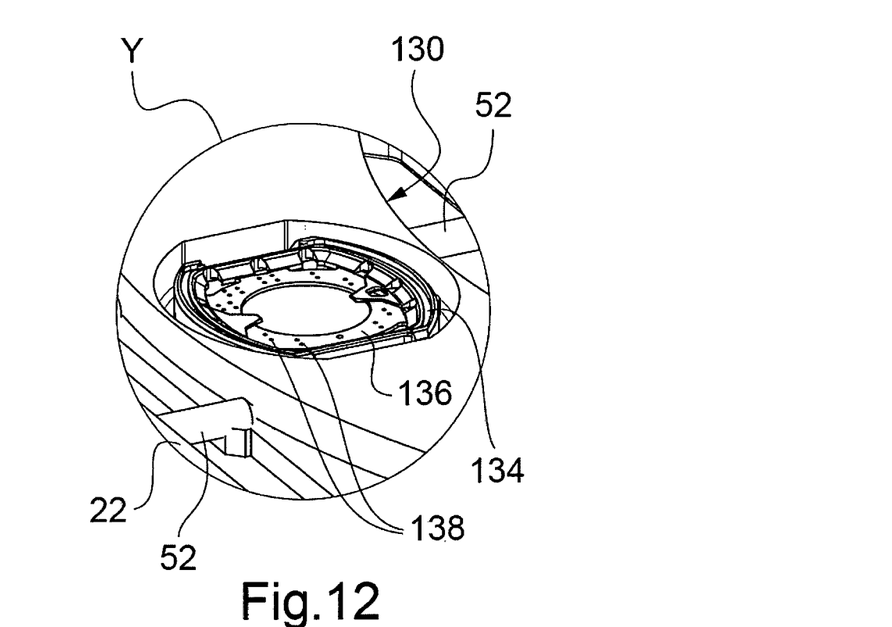
FIG. 12 is an enlarged view of zone X of FIG. 11.

The part produced during the second machining step is a third intermediate part 140, shown in FIGS. 11 and 12. Depending on the nature of the required final timepiece component, some finishing machining operations are carried out. In the example illustrated, mounting holes 138 are created on the machined face, which will be used to secure other elements to the final timepiece component when the watch is assembled.

Third intermediate part 140 resulting from the second machining phase has the final dimensions and appearance of the upper face of a one-piece middle case and dial assembly.

Figure 13:
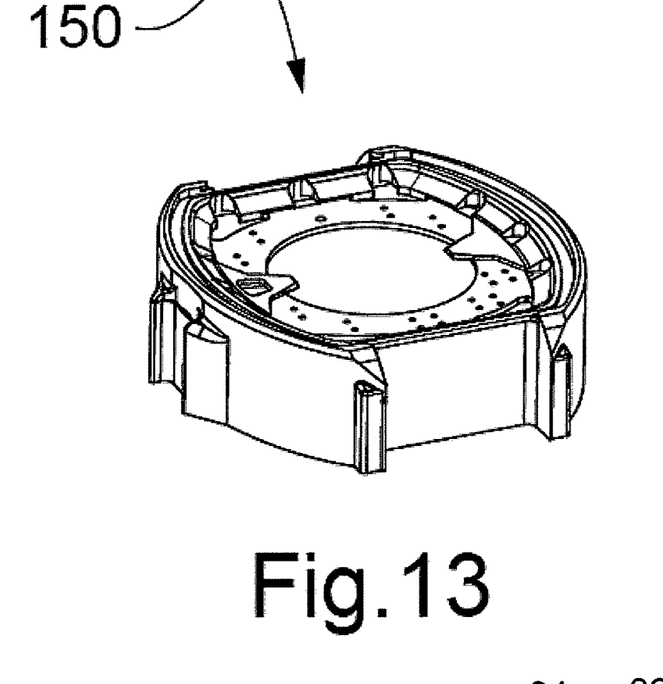
FIG. 13 shows, in a perspective view, the part produced following the third machining step.

It is still held on first machining fixture 20 fitted to plate 18 of machine tool 10, to undergo a third machining step involving a trimming operation, resulting in a fourth intermediate part 150, shown in FIG. 13.

Fourth intermediate part 150 is then fitted to second machining fixture 30 for a fourth machining step intended to shape the underside of the final timepiece component.

Figure 14:
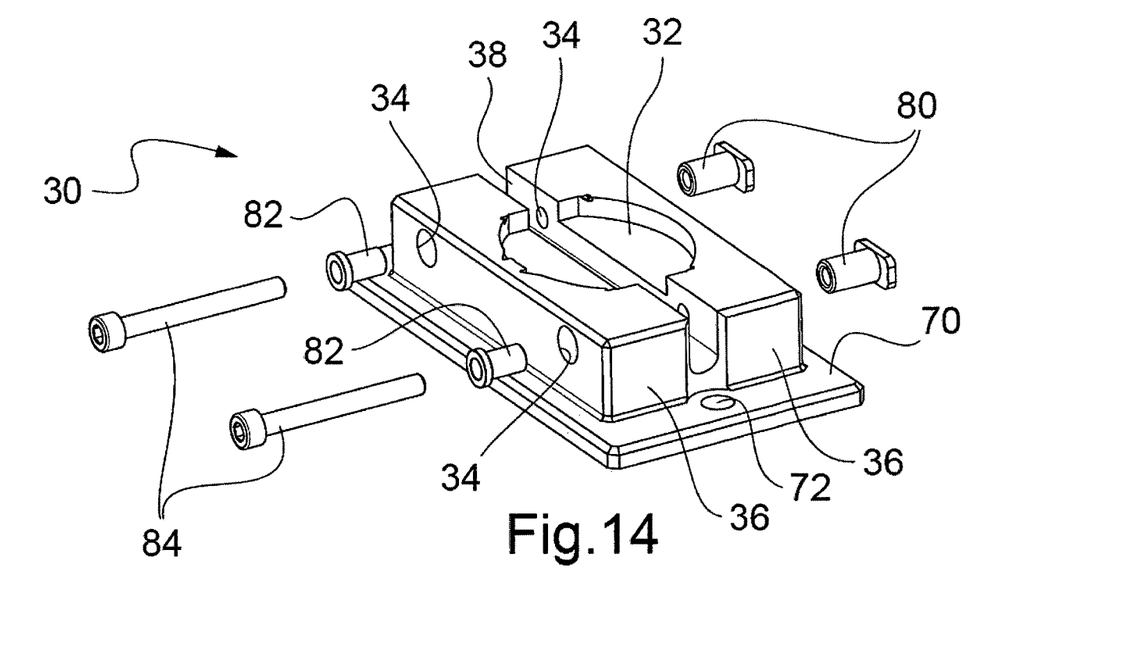
FIG. 14 shows, in an exploded perspective view, the second machining fixture of FIG. 3.

Second machining fixture 30 is shown as an exploded view in FIG. 14. It is a machined part, specially designed and sized to accommodate fourth intermediate part 150.

Second machining fixture 30 is part of a roughly parallelepiped block, one surface of which is hollowed out to define a counter-form 32 of fourth intermediate part 150, said counter-form 32 meeting very fine tolerances, of the order of a hundredth of a millimetre.

Second machining fixture 30 comprises two lateral blocks 36 separated by a longitudinal aperture 38 open on the face housing counter-form 32 and closed on the opposite face.

Second machining fixture 30 also comprises through holes 34, which run transversally through each one of the two lateral blocks 36. Said through holes 34 are designed to accommodate clamping devices 80, 82, 84 whose purpose, when in service, is to bring the two lateral blocks 36 noticeably closer to one another.

In the illustrated example, clamping devices 80, 82, 84 comprise clamping bolts 84, which cooperate with metal inserts 80, 82.

Preferably, second machining fixture 30 is made of a material that will not damage fourth intermediate part 150 during the clamping operation, in particular plastic material that can be, for example, plastic sold under the brand name Delrain®.

Second machining fixture 30 is secured to plate 18 (FIG. 3) via centring cavity 2 (see FIG. 4), by screws, for example two M8 screws (not shown), which cooperate with threaded holes 72 of a base 70 of said third machining fixture 30 and with clamping holes 4 on plate 18 (FIG. 4).

Figure 3:
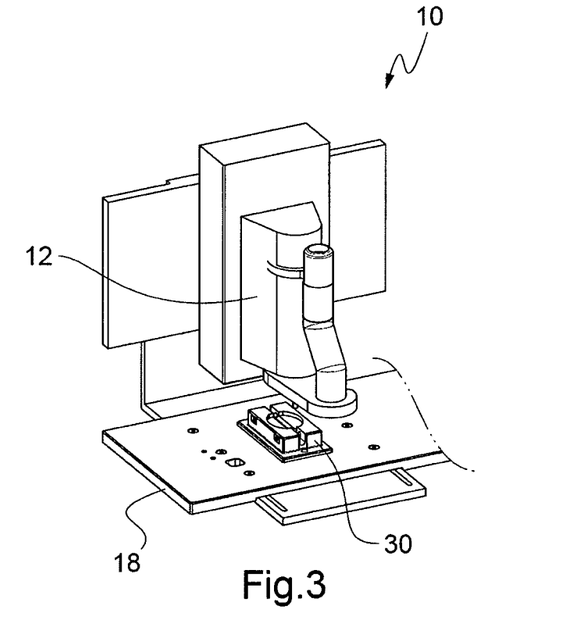
FIG. 3 shows, in a top perspective view, the machine tool fitted with a second machining fixture used for a fourth machining step.
Figure 15:
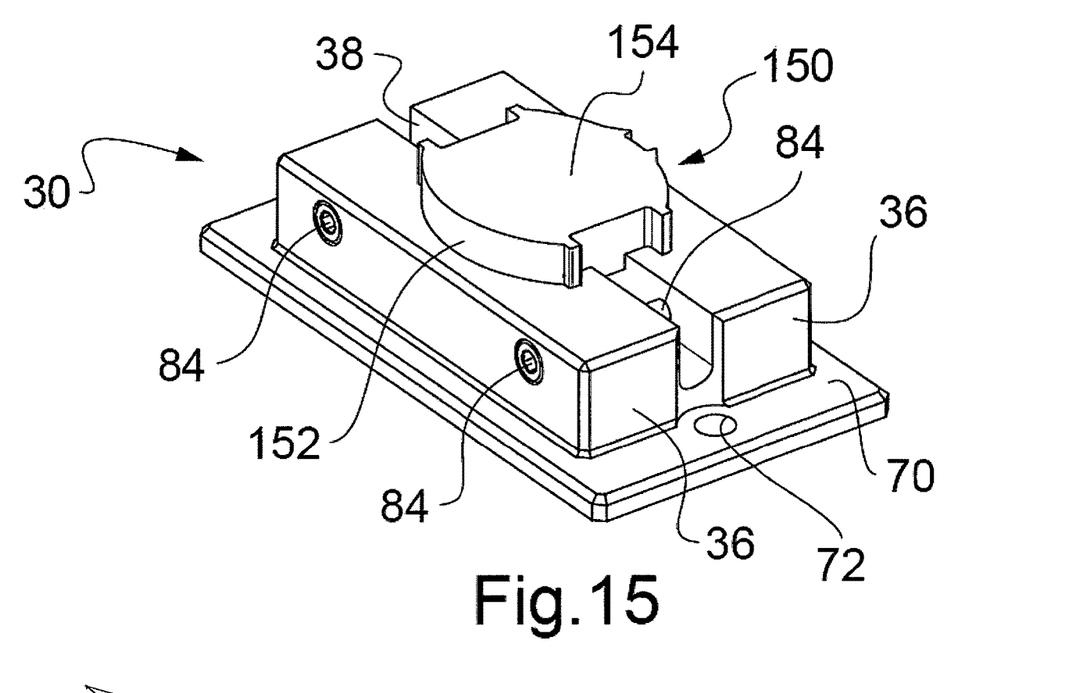
FIG. 15 shows, in a perspective view, the part of FIG. 13 fitted to the second machining fixture for the fourth machining step.

FIG. 15 shows fourth intermediate part 150 fitted to second machining fixture 30. It has a lateral face 152 shaped by trimming during the third machining step. It has a first end face (not shown in FIG. 13) shaped by milling during the second machining step and facing towards the bottom end of longitudinal aperture 38 of second machining fixture 30. Finally, it has a second end face 154, opposite the first end face, and exposed to machining tool 16 (FIG. 3).

Fourth intermediate part 150 is fitted to second machining fixture 30 being positioned in counter-form 32 of said second machining fixture 30, and being held with the highest precision between the two lateral blocks 36 of said second machining fixture 30, which are brought closer to one another with clamping devices 80, 82, 84 and thanks to the elasticity of the component material of said lateral blocks 36.

A fourth machining step is then carried out on fourth intermediate part 150, involving milling its second end face 154, which will become the underside of the final timepiece component.

Figure 16:
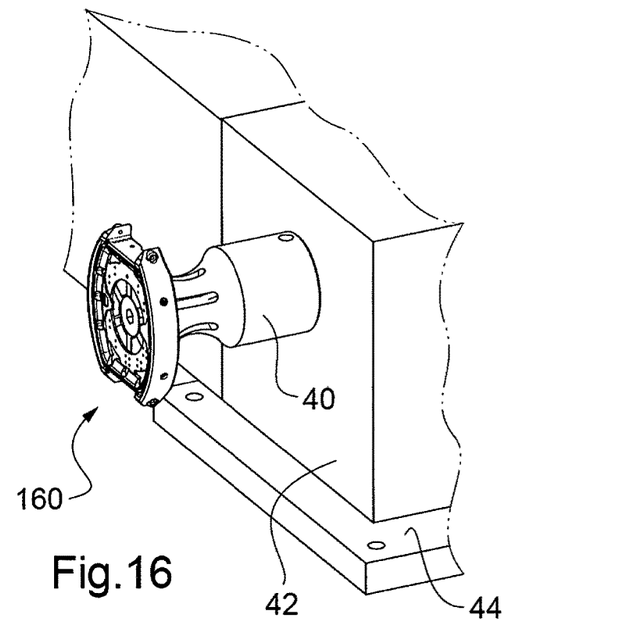
FIG. 16 shows, in a perspective view, the fifth machining step performed on the part produced by the fourth machining step.

Fourth intermediate part 150 whose second end face was machined is now a fifth intermediate part 160, fitted to third machining fixture 40 to undergo a fifth machining step, as shown in FIG. 16.

Said third machining fixture 40 is secured to plate 18 of machine tool 10 with chassis elements 42, 44 (FIG. 4).

Fifth intermediate part 160 is positioned on third machining fixture 40 thanks to the presence, on said third machining fixture 40, of a counter-form (not shown in the figures) of the lateral face of said fifth intermediate part 160 and by the actuation of a central screw, which opens said counter-form thanks to the elasticity of the material which the third machining fixture 40 is made of, namely aluminium in the illustrated example.

The fifth machining step involves performing finishings on fifth intermediate part 160, in order to obtain a final timepiece component 170. The finishings involve making decorations as well as cavities and other embossments intended to enable said timepiece component 170 to cooperate with other timepiece components at the time of their final assembly to form a watch.

Figure 17:
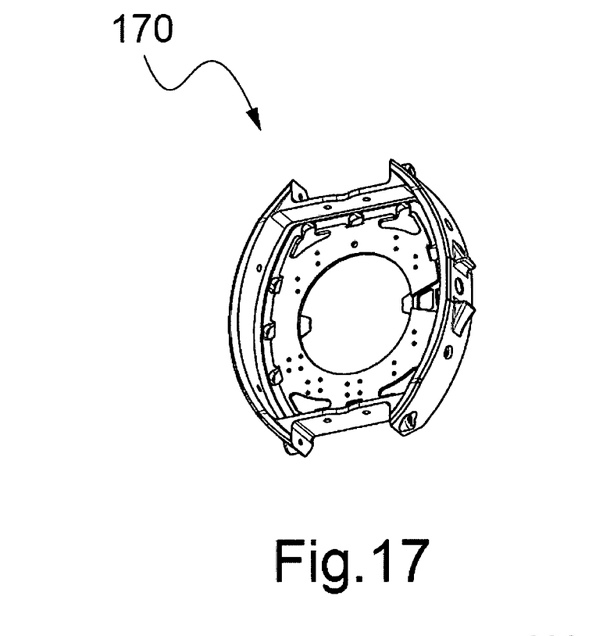
FIG. 17 shows, in a bottom perspective view, the final timepiece component of the fifth machining step.

In the example illustrated in FIG. 17, final timepiece component 170, produced by the first variant of the method according to the invention, is a one-piece middle case and dial assembly.

The method according to the first variant, shown in FIGS. 2 to 17, comprises the following steps:
First machining step: pre-machining, milling of the upper face
Processing step
   Resin casting operation
   Vacuum process operation
   Curing operation
   Post-curing operation
Second machining step: actual milling of the upper face
Third machining step: trimming
Fourth machining step: milling of the underside
Fifth machining step: finishing The embodiment of the second variant of the method will now be described in reference to FIGS. 18 to 23.

According to this second variant, the manufacturing method according to the invention comprises a step for crushing an initial part in a carbon-carbon composite material.

Figure 18:
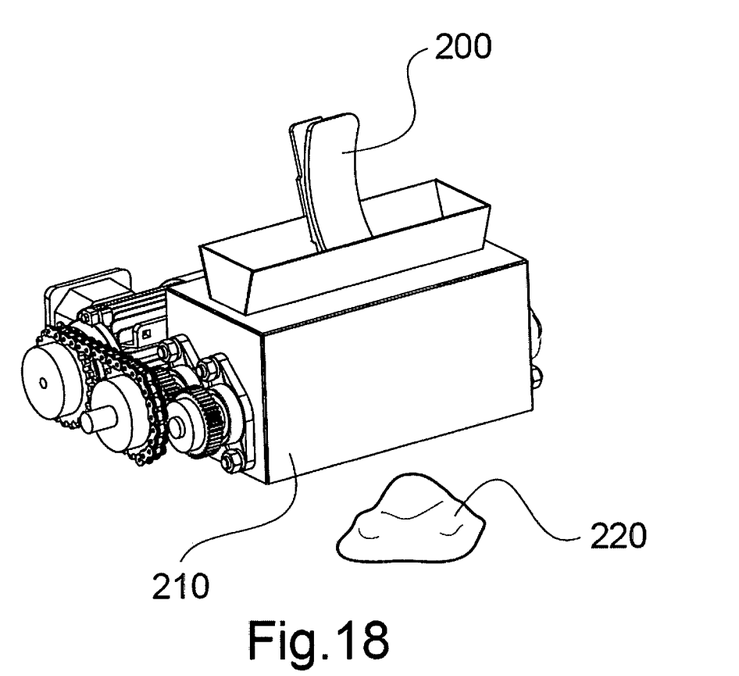
FIG. 18 shows, in a perspective view, the crushing step of the second variant of the method.

The crushing step is shown in FIG. 18. An initial part 200 in a carbon-carbon composite material is crushed in a crushing machine 210, for example a RETSCH BB 400 XL jaw crusher. Initial part 200 is reduced to a heap of fines 220.

Preferably, crushing machine 210 is set up so that the fines 220 produced by crushing have a predetermined maximum length, for example 2 millimetres. The size of the fines affects the quality of detail of the final timepiece component resulting from the second variant of the method.

The processing step comprises a resin casting operation and a heating up operation.

It is complemented by a moulding step comprising a pouring operation, a pressing operation and a demoulding operation.

The two processing and moulding steps are interlinked with the operations carried out in the following sequence:
   resin casting operation
   pouring operation
   pressing operation simultaneous with a heating up operation
   demoulding operation The resin casting operation (not shown in the figures) involves mixing fines 220 resulting from crushing with a thermosetting resin. The selection criteria of said resin are the same as for the first variant of the method and will not be described a second time. An epoxy resin is preferred.

Optionally, the resulting mixture 240 can be enhanced with additives, for example precious metals or colourings.

Figure 19:
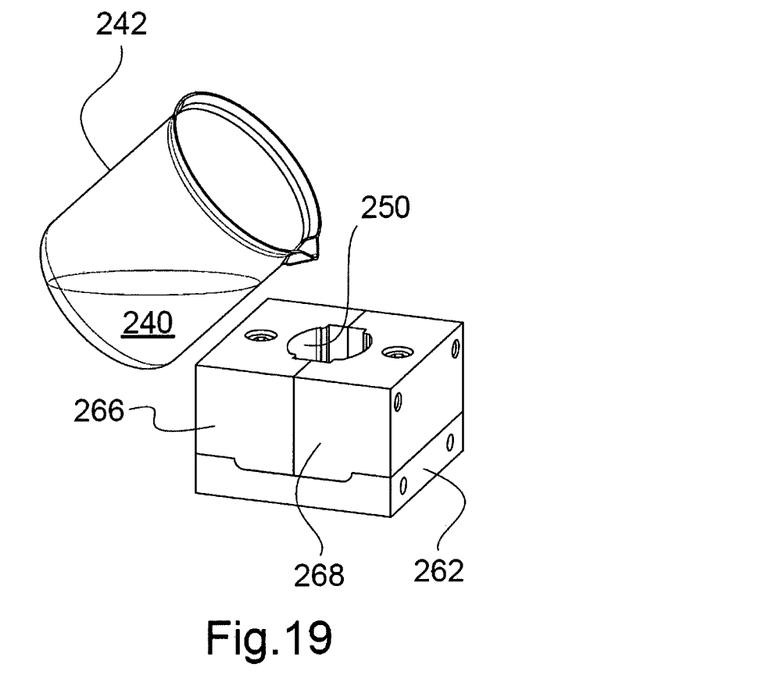
FIG. 19 shows, in a perspective view, the filling step of the moulding step of the second variant of the method.

The pouring operation, shown in FIG. 19, involves pouring mixture 240 made up of fines 220 of the homogenate and the resin in cavity 250 of a mould 260, for example by means of a container 242.

Figure 20:
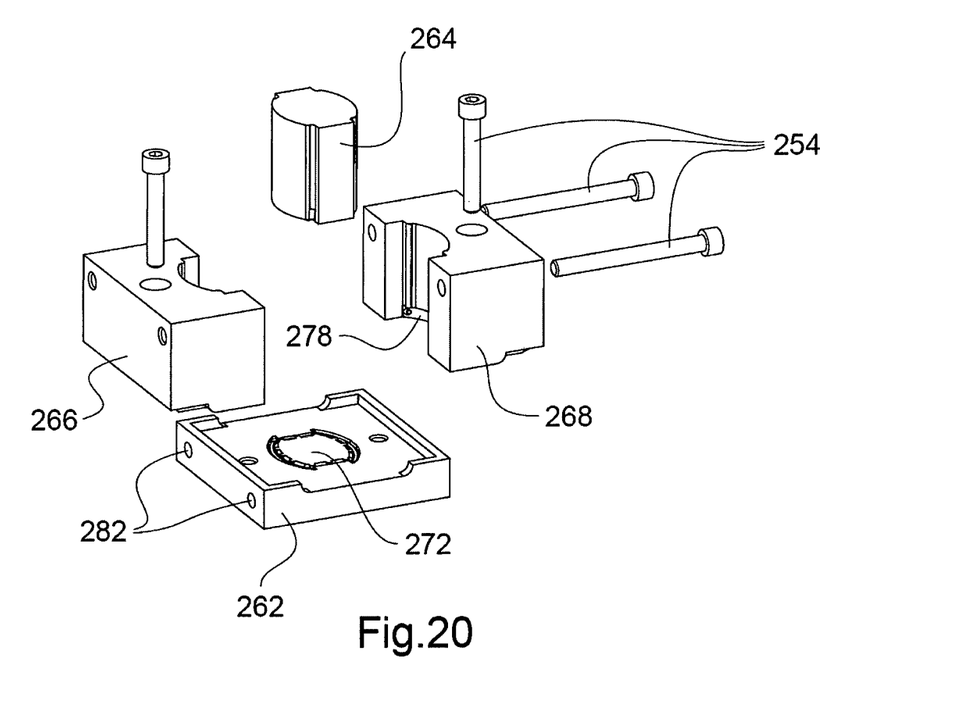
FIG. 20 is a top exploded perspective view of the mould used for the moulding step.
Figure 21:
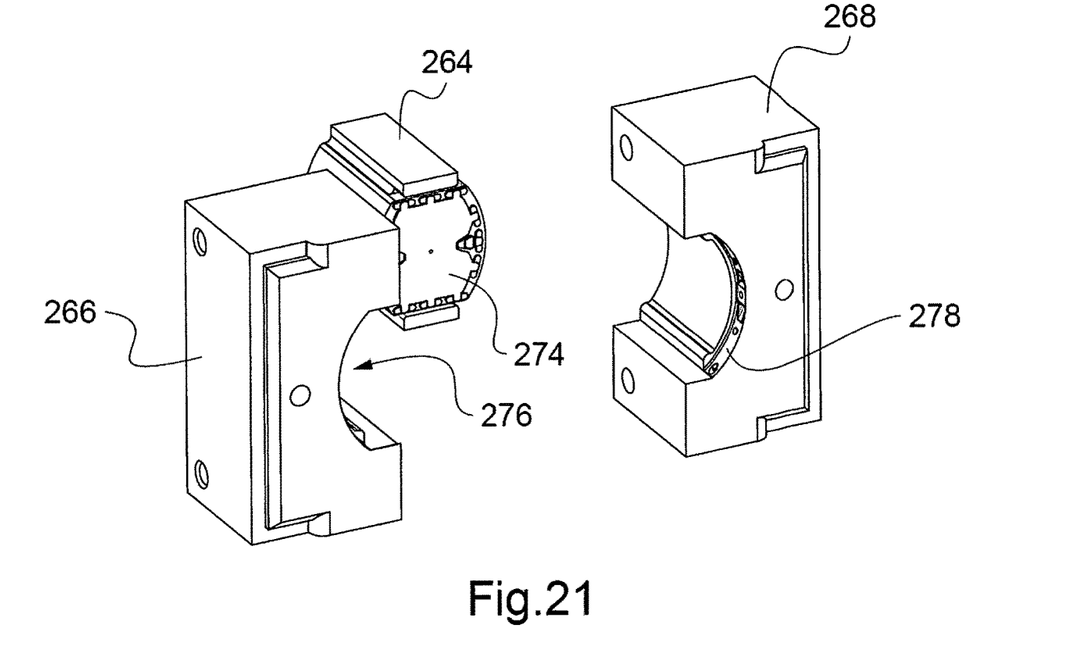
FIG. 21 is a partial bottom exploded perspective view of the mould used for the moulding step.

Mould 260 is shown as an exploded view in FIGS. 20 and 21. It is made of hardened steel to be able to withstand distortion during the pressing operation.

Mould 260 comprises several elements 262, 264, 266, 268, of which there are four in the illustrated example. Each element 262, 264, 266, 268 is hollowed out with cavity sections 272, 274, 276, 278. More specifically, a lower element 262 bears a lower cavity section 272, an upper element 264 bears an upper cavity section 274, and two lateral elements 266, 268 each bear a lateral cavity section 276, 278.

Figure 22:
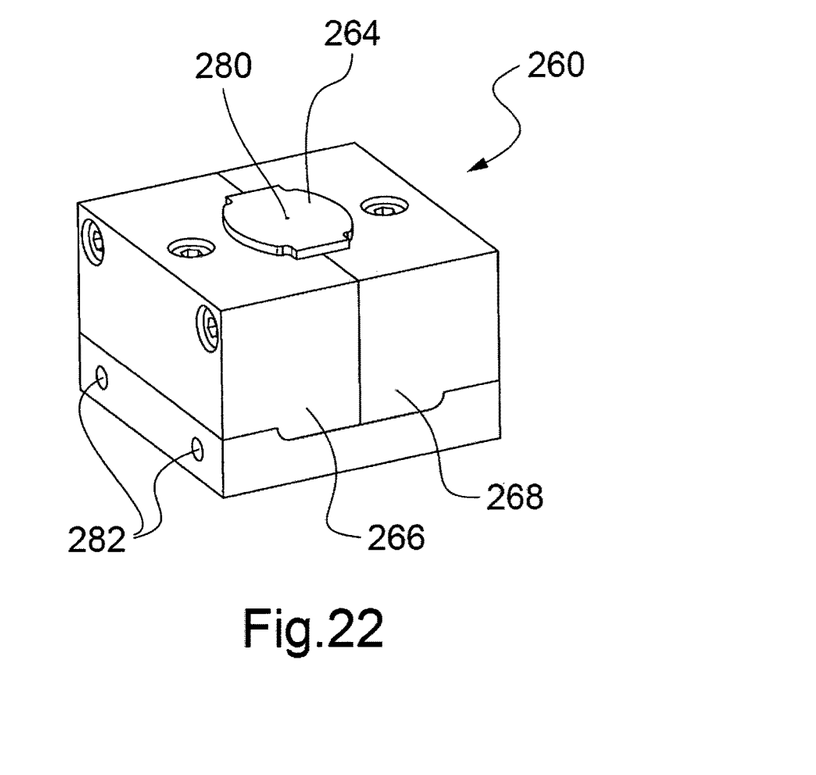
FIG. 22 shows, in a perspective view, the pressing operation of the moulding step of the second variant of the method.

Lower element 262 is assembled with the two lateral elements 266, 268, with cap screws 254, which enables the creation of cavity 250 wherein mixture 240 is poured (FIG. 19). Cavity 250 is then sealed with upper element 264, as shown in FIG. 22.

In a manner which is per se known, upper element 268 has an air outlet 280 during the pressing operation, with a diameter defined so that the resin is not discharged along with the air.

The assembly of cavity sections 272, 274, 276, 278 makes up an entire mould cavity (not shown in the figures) having the definite design and dimensions of the required timepiece component.

Optionally, a stiffening insert (not shown in the figures) can be incorporated into cavity 250 of mould 260, to increase the strength and sealing of the final timepiece component produced by moulding. The stiffening insert may be made of metal, a composite, or any other appropriate material within the reach of the person skilled in the art.

Mixture 240 contained in the entire cavity then undergoes the pressing operation, during which it is compressed inside the closed mould (FIG. 22), which is pressed, for example in a hydraulic press, not shown in the figures. Mixture 240 is subjected to a pressure that can range from a few kilogrammes per square centimetre to several hundred kilogrammes per square centimetre. Pressing results in increasing the cohesion between the mixture components 240, namely fines 220 of the homogenate, the resin and any additives.

Simultaneously with the pressing operation, the heating up operation is applied, which results in the polymerisation of the resin. It is performed by means of heating resistors (not shown in figures), which are inside holes 282 of lower element 262 of mould 260 (FIG. 22). The temperature reached during the heating up operation, as well as its duration, depend on the resin used, and are similar to the temperature and duration recommended for the embodiment of the first variant of the method.

Figure 23:
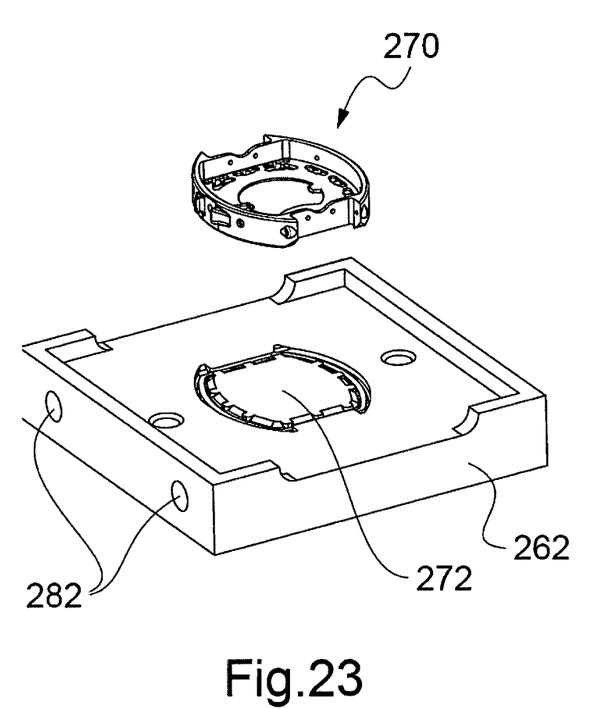
FIG. 23 shows, in a perspective view, the demoulding operation of the moulding step of the second variant of the method.

The demoulding operation is shown in FIG. 23, which shows the final timepiece component 270 above lower element 262 of mould 260, featuring lower cavity section 272.

The method according to the second variant comprises an optional fines washing step, not shown in the figures, which follows the fine crushing step of initial part 200, and which precedes the processing step. Washing can be done, for example, by spraying a detergent or by soaking the fines in a washing bath.

The washing step removes residue from the homogenate which could adversely affect the moulding, and which can come for example from grease coming into contact with the fines during the crushing operation. The detergent is selected for its ability to dissolve greases, and its evaporation ability. Acetone is preferred.

The method according to the second variant comprises an optional fines screening step, not shown in the figures, which follows the fine crushing step of the carbon-carbon composite part, and which precedes the processing step. The screening process can be done, for example by means of an AS 200 BASIC SIEVE machine.

The screening step results in removing the fines having a size greater than 2 millimetres, which could be present in the homogenate as well as impurities, which could potentially be in initial part 200, when said part is a used part.

In the example illustrated, final timepiece component 270, produced by the second variant of the method according to the invention, is a one-piece middle case and dial assembly.

According to the nature of the final timepiece component obtained after demoulding, a finishing step can be planned as an option. It may be manual if it involves removing resin residue or polishing or deburring the final timepiece component. It may consist of machining, similar to that of the fifth step of the first embodiment of the first variant of the method, if it involves creating decorations as well as cavities and other embossments intended to enable said timepiece component 170 to cooperate with other timepiece components at the time of their final assembly to form a watch.

The method according to the second variant, shown in FIGS. 18 to 23, comprises the following steps:
Crushing step
Optional washing step and/or optional screening step
Processing step:
  Resin casting operation
  Heating up operation
Moulding step
  Filling step
  Pressing operation
  Demoulding operation
Optional manual or machining finishing step

The invention claimed is:

1. A method for manufacturing a timepiece comprising:
a first machining step of machining a face of a component of the timepiece so as to create areas having a predetermined raised section;
and, following the first machining step, a processing step of processing the component of the timepiece in a carbon-carbon composite material, said processing step including performing a resining operation on the component followed by machining of the component.

2. A method according to claim 1, wherein said first machining step further comprises creating areas having a predetermined hollow section.

3. A method according to claim 1 wherein the processing step is followed by a second machining step applied to said face of the component.

4. A method according to claim 3 further comprising at least one additional machining step, subsequent to the second machining step.

5. A method according to claim 1 wherein the processing step further comprises a vacuum-process operation and a curing operation simultaneous with the vacuum-process operation.

6. A method according to claim 5, wherein the processing step further comprises a post-curing operation that follows the simultaneous vacuum process and curing operations.

7. A method according to claim 1 wherein said carbon-carbon composite material stems from a brake pad or disk of a racing vehicle, an airplane brake disk or a space shuttle tile.

8. A method according to claim 7, wherein said carbon-carbon composite material is from a used part.

* * * * *